G. W. Shields.
Combined Globe and Check Valve.
118287
PATENTED AUG 22 1871
Fig 1.
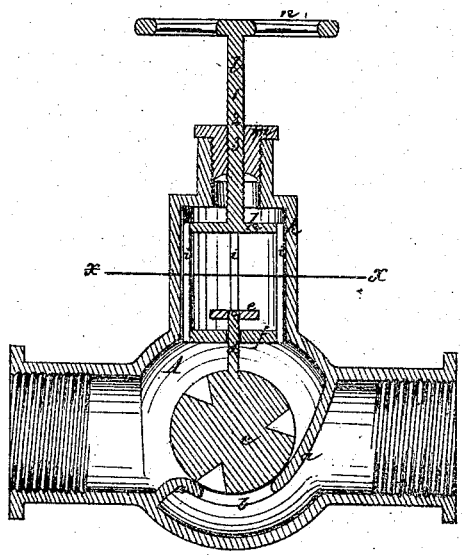
Fig. 3.
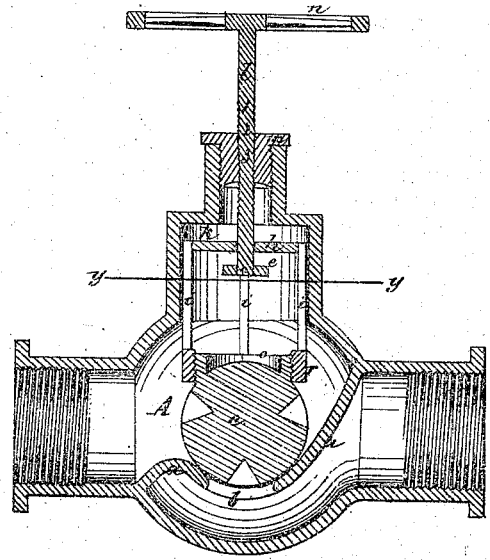
Fig. 2. x-x
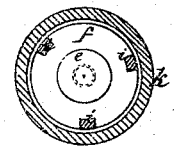
Fig. 4. y-y
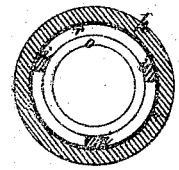
Witnesses:
Inventor:

UNITED STATES PATENT OFFICE.

GEORGE W. SHIELDS, OF LOUISVILLE, KENTUCKY, ASSIGNOR TO HIMSELF, MICHAEL L. MITCHELL, AND JOHN A. MELCHER, OF SAME PLACE.

IMPROVEMENT IN GLOBE AND CHECK-VALVES.

Specification forming part of Letters Patent No. 118,287, dated August 22, 1871.

*To all whom it may concern:*

Be it known that I, GEORGE W. SHIELDS, of Louisville, in the county of Jefferson and State of Kentucky, have invented a new and Improved Combined Check and Globe-Valve; and I do hereby declare the following to be a full, clear, and exact description of the same, reference being had to the accompanying drawing making a part of this specification, in which—

Figures 1 and 3 are sectional elevations of two varieties of my invention; and Figs. 2 and 4 are sectional plans of these varieties, respectively, taken in the lines $x\ x$ and $y\ y$.

This invention consists of a common globe-valve provided with a vertical stem having a horizontal disk on its top, in combination with a vertical frame inclosing said disk, the valve-stem passing through the lower end of the frame, which latter has a threaded stem projecting from its upper end, said stem passing through a stuffing-box in the upper side of the valve-chamber, by turning which threaded stem the frame may be lowered so as to touch the valve and confine it to its seat, or elevated away from the valve so as to leave the latter free to rise under the action of steam, gas, or water.

Referring to the drawing, A, Fig. 1, is a valve-chamber; $a$, the valve-seat; $b$, the aperture for the passage of steam or water; $c$, the globe-valve covering said aperture; $d$, the stem projecting vertically from the top of said valve; $e$, the disk on the top of the stem $d$; $f$, the lower, and $h$ the upper circular horizontal plates, which, when connected by the vertical standards $i$, form a frame, which is placed within the chamber $k$, the lower plate $f$ being provided with a central aperture through which the valve-stem passes, the disk $e$ being above the plate $f$. $l$ is the threaded stem extending upward from the plate $h$ through a threaded aperture in the plug $m$, which closes the top of the chamber $k$; and $n$, a hand-wheel on the top of the stem $l$.

By turning the hand-wheel $n$ in one direction the frame is lowered so far that the plate $f$ rests upon the valve and confines it to its seat. On turning the hand-wheel in the contrary direction the frame is raised away from the valve, leaving the latter free to rise. The figures marked on the stem $l$ show the operator the position of the plate $f$ with reference to the valve.

Fig. 3 shows another form of this device. Here, instead of the valve-stem and lower plate $f$, we have a ring, $o$, cast on the upper side of the valve, and a ring, $r$, attached to the lower ends of the standards $i$. The ring $r$ is screwed on the outside of the ring $o$. The stem $l$ passes through an orifice in the upper plate $h$, and has a disk, $e$, on its lower end. By turning the stem $l$ downward until the disk $e$ touches the valve the latter is held fast on its seat. On raising the stem $l$ the valve is left free to rise. The disk $e$ is fastened upon the stem $l$ by a pin, which prevents the disk from working off. The ring $r$ is likewise secured upon the ring $o$ by a pin for the same purpose.

From the foregoing description it will be perceived that this invention operates either as a globe or as a check-valve. It can be used in any kind of pumps or "doctors" for steam-boats, and also in all kinds of gas or steam-works. The frame is made of skeleton form, in order that all foreign matters, such as sand, mud, and the like, may pass through, and not obstruct the working of the valve. The frame is to be attached to the valve as shown in Fig. 3, when a weighted valve is desired.

Having thus described my invention, what I claim as new, and desire to secure by Letters Patent, is—

The arrangement of the valve $c$, provided with the stem $d$ and disk $e$, with the skeleton frame, threaded stem $l$, and plug $m$, as specified.

GEORGE W. SHIELDS.

Witnesses:
SOLON C. KEMON,
JOHN H. W. YOUNG.